Dec. 19, 1922.

G. A. SCHULTE.
CASTER RETAINER.
FILED FEB. 24, 1922.

1,439,333.

Inventor.
George A. Schulte,
By Frederick V. Winters,
Attorney.

Patented Dec. 19, 1922.

1,439,333

UNITED STATES PATENT OFFICE.

GEORGE A. SCHULTE, OF NEWARK, NEW JERSEY.

CASTER RETAINER.

Application filed February 24, 1922. Serial No. 539,011.

*To all whom it may concern:*

Be it known that I, GEORGE A. SCHULTE, a citizen of the United States, residing at Newark, in the county of Essex and State of New Jersey, have invented certain new and useful Improvements in Caster Retainers, of which the following is a full, clear, and exact specification.

This invention relates to caster retainers, and has for its object to provide improved means for detachably holding a caster in the hollow leg or other socket of furniture.

A special object is to provide a combined socket closing disk and internal wall engaging spring which may be removably fitted in the socket of the furniture and with which a caster may be detachably connected. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
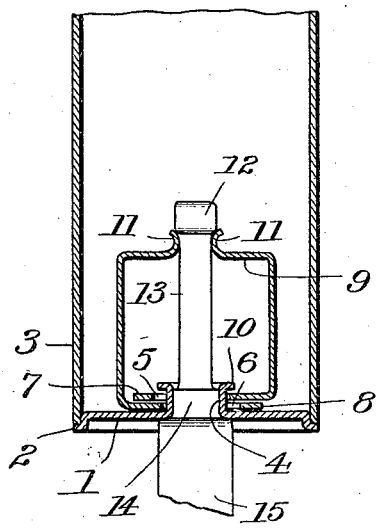
Figure 1 is a central longitudinal section of a caster retainer constructed substantially in accordance with this invention, the same being shown applied to a hollow furniture leg and having a caster shank engaged therewith.
Figure 2:
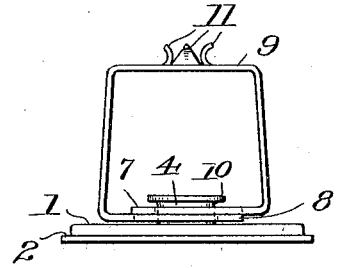
Figure 2 is a side view of the caster retainer in detail.

The retainer comprises a socket closing disk 1, and a spring member 9 connected to said disk and bent into substantially rectangular form with the lower portions of its sides normally spread apart to frictionally engage the internal walls of the socket or hollow leg 3 of the furniture. At the bottom said spring member 9 has overlapping end portions 7 and 8 having elongated slots 5 and 6, respectively, which loosely engage an upwardly extending tubular sleeve or ferrule 4 formed centrally of the disk 1 and having an outwardly extending annular flange 10 at its upper end for retaining said slotted end portions 7 and 8 in engagement therewith. Said slots 5 and 6 allow the end portions 7 and 8 of the spring member to slide on the sleeve 4 so that the sides of said member may frictionally engage the internal walls of the socket or hollow leg 3 when said spring member is inserted into the same and the sides of the member are compressed thereby, as shown in Figures 1 and 3.

The disk 1 is formed with a stepped flange 2 around its periphery to fit in the opening of the socket of hollow leg 3, whereby the retainer is centered therein and supported in said socket. The internal diameter of the sleeve 4 is of a size to fit around the ridge 14 on the lower end of the shank 13 of a caster 15 of any suitable type, see Figure 1. Said shank of the caster also has an enlarged head or knob 12 at its upper end, of substantially the same diameter as the ridge 14, whereby it may be readily passed through said sleeve when the caster is attached to the retainer.

Figure 3:
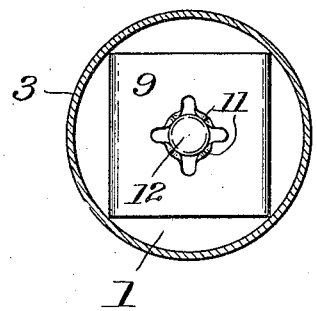
Figure 3 is a plan view of the retainer and caster shank as shown in Figure 1, the hollow furniture being shown in section
Figure 4:
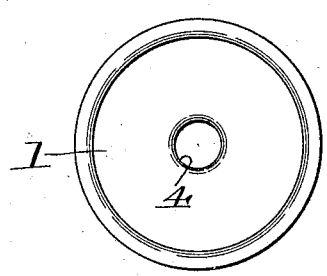
Figure 4 is a bottom plan view of the retainer, as shown in Figure 2.

To hold the caster in position in the retainer, the upper portion of the spring member 9 is formed with a central opening arranged in vertical alinement with the sleeve 4 and surrounded with resilient spurs or fingers 11 adapted to engage the shank 13 just below the head 12 when said shank is fully inserted into the retainer, as shown in Figures 1 and 3. When the caster shank is thus positioned in the retainer, the ridge 14 fits snugly in the sleeve 4 and prevents lateral play or rattling thereof when the furniture is moved on the caster.

The engagement of the slotted end portions 7 and 8 of the spring member 9 with the sleeve 4 of the disk 1 connects these parts of the retainer so that they cannot be separated one from the other. When said retainer is inserted in the socket or hollow leg of the furniture, the spring member retains it in place but allows it to be removed when desired. The caster shank 13 may be engaged with or disengaged from said retainer when the latter is in the socket or hollow leg 3, or when separated therefrom.

I claim:

1. In a caster retainer, the combination with a disk for closing a furniture socket, of a spring member for frictionally engaging the internal walls of the socket, said spring member being inseparably connected to said disk and adapted to slide thereon for the purpose specified.

2. In a caster retainer, the combination with a member to engage the mouth of a furniture socket, of a spring member for frictionally engaging the internal walls of the socket, said mouth engaging member having a hollow sleeve for the passage of a caster shank, and said spring member having slotted portions loosely fitting around said sleeve for the purpose specified.

3. In a caster retainer, the combination with a member to engage the mouth of a furniture socket, of a spring member for frictionally engaging the internal walls of the socket, said mouth engaging member having a hollow sleeve for the passage of a caster shank, said spring member having slotted portions loosely fitting around said sleeve, and an abutment on said sleeve for retaining said slotted portions of the spring member thereon.

4. In a caster retainer, the combination with a member to engage the mouth of a furniture socket, of a spring member for frictionally engaging the internal walls of the socket, said mouth engaging member having a hollow sleeve for the passage of a caster shank, said spring member having slotted portions loosely fitting around said sleeve, there being an opening in said spring member in vertical alinement with said sleeve through which opening the caster shank is also adapted to pass, and resilient means at the margin of said opening for detachably retaining the caster shank therein.

In testimony whereof I have signed my name to this specification.

GEORGE A. SCHULTE.